(12) United States Patent
Margolin et al.

(10) Patent No.: US 11,755,690 B1
(45) Date of Patent: Sep. 12, 2023

(54) MITIGATING ADD FINANCIAL INSTITUTION ERRORS BY LEVERAGING GEOLOCATION DATA

(71) Applicant: INTUIT INC., Mountain View, CA (US)

(72) Inventors: Itay Margolin, Tel Aviv (IL); Alexsandr Kim, Tel Aviv (IL); Yagil Ovadia, Tel Aviv (IL); Yair Horesh, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/067,615

(22) Filed: Dec. 16, 2022

(51) Int. Cl.
    *G06F 16/00* (2019.01)
    *G06F 18/24* (2023.01)
    *G06F 16/29* (2019.01)

(52) U.S. Cl.
    CPC .............. *G06F 18/24* (2023.01); *G06F 16/29* (2019.01)

(58) Field of Classification Search
    CPC .................................. G06F 18/24; G06F 16/29
    See application file for complete search history.

(56) References Cited

U.S. PATENT DOCUMENTS

| 7,213,003 | B1 * | 5/2007 | Kight ..................... | G06Q 20/10 705/40 |
| 2005/0281450 | A1 * | 12/2005 | Richardson .......... | G06V 30/262 382/139 |
| 2013/0036050 | A1 * | 2/2013 | Giordano ............... | G06Q 10/10 705/44 |

* cited by examiner

*Primary Examiner* — Dinku W Gebresenbet
(74) *Attorney, Agent, or Firm* — DLA PIPER LLP (US)

(57) ABSTRACT

Techniques for detecting fraud may include mapping routing numbers of one or more financial institutions with geolocation data of the financial institutions; obtaining a geolocation of a user based on the user's internet protocol (IP) address; obtaining a first user input from the user indicating a first financial institution; generating a match score for each of the one or more financial institutions that indicates a level of match between the first user input and the respective financial institution; boosting the match score for each financial institution based on its location with respect to the geolocation of the user; generating a list of financial institutions having the boosted match score above a threshold; obtaining a second user input from the user indicating at least one second financial institution; and presenting search results to the user based on the second user input, wherein the search results are boosted.

20 Claims, 8 Drawing Sheets

FIG.8

MITIGATING ADD FINANCIAL INSTITUTION ERRORS BY LEVERAGING GEOLOCATION DATA

BACKGROUND

Finance, budgeting, or tax applications may require a user to fill in their bank account information during the on-boarding process. As there are over thousands of different banks or financial institutions, often with similar names, it may lead to the user being confused with the proper name of the financial institution that many times textually overlap. This is undesirable.

BRIEF DESCRIPTION OF DRAWINGS

Other objects and advantages of the present disclosure will become apparent to those skilled in the art upon reading the following detailed description of example embodiments, in conjunction with the accompanying drawings, in which like reference numerals have been used to designate like elements, and in which.

DESCRIPTION

The systems and methods of the present disclosure provide technical solutions to mitigate the problem described in the background section by leveraging the routing number of the financial institutions/banks and the IP address of the user. The routing number of a financial institution contains information about a geo-location of the financial institutions. Similarly, the IP address contains information about a geo-location of the user.

Figure 1:
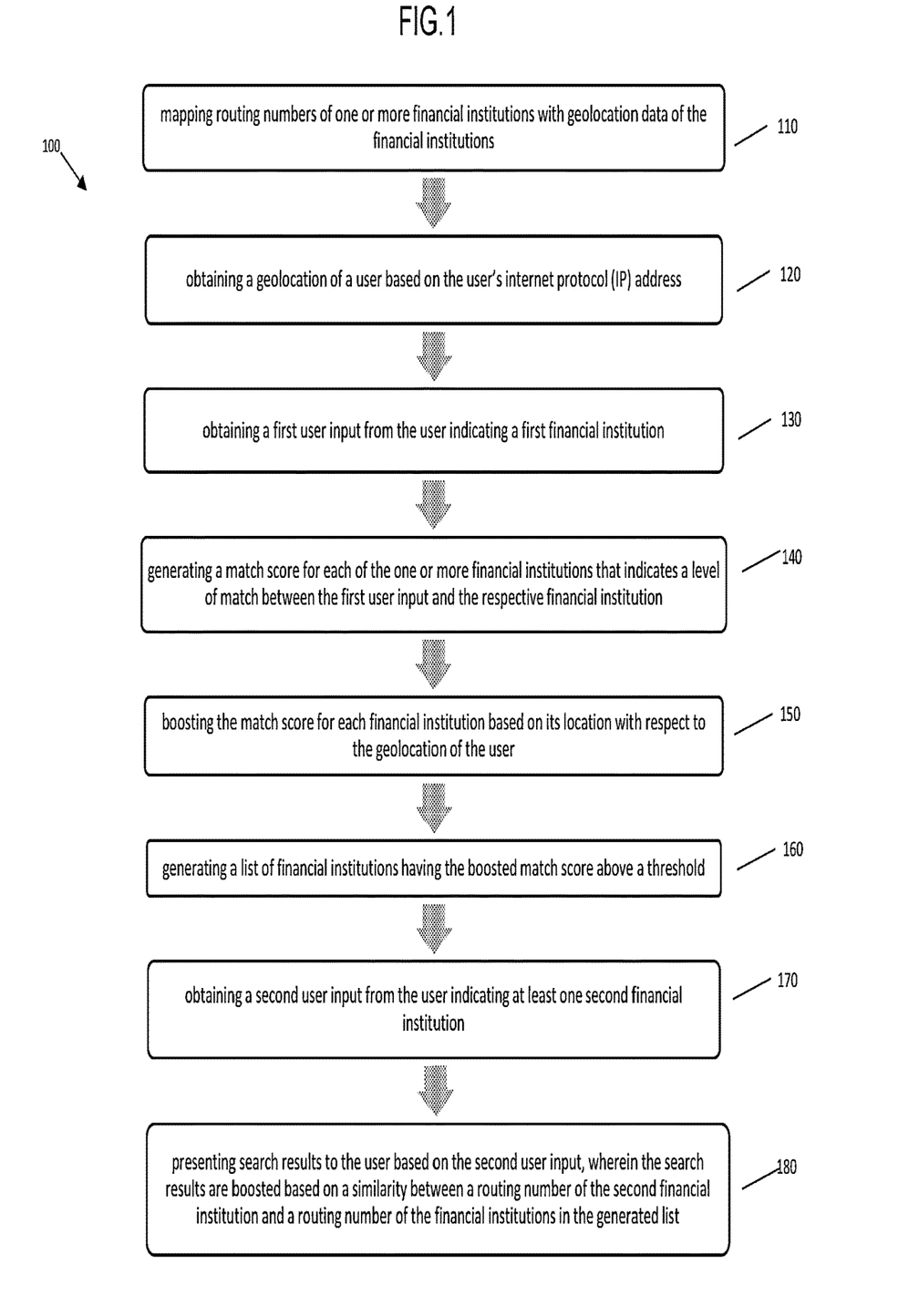
FIG. 1 shows a flowchart of a method according to an example embodiment of the present disclosure.

FIG. 1 shows a flowchart for a computer-implemented method 100 in accordance with an example embodiment of the present disclosure. The steps of method 100 are exemplary, and elements may be added or removed from the method 100 without deviating from the inventive concepts of the present application. In one or more embodiments, the method 100 may include the following steps: a step 110 of mapping routing numbers of one or more financial institutions with geolocation data of the financial institutions; a step 120 of obtaining a geolocation of a user based on the user's internet protocol (IP) address; a step 130 of obtaining a first user input from the user indicating a first financial institution; a step 140 of generating a match score for each of the one or more financial institutions that indicates a level of match between the first user input and the respective financial institution; a step 150 of boosting the match score for each financial institution based on its location with respect to the geolocation of the user; a step 160 of generating a list of financial institutions having the boosted match score above a threshold; a step 170 of obtaining a second user input from the user indicating at least one second financial institution; and a step 180 of presenting search results to the user based on the second user input. In one or more embodiments, the search results are boosted based on a similarity between a routing number of the second financial institution and a routing number of the financial institutions in the generated list.

Although the steps 110-180 are illustrated in sequential order, these steps may also be performed in parallel, and/or in a different order than the order disclosed and described herein. Also, the various steps may be combined into fewer steps, divided into additional steps, and/or removed based upon a desired implementation.

At step 110, routing numbers of one or more financial institutions can be mapped with geolocation data of financial institutions. Routing numbers are nine-digit numbers that can identify a financial institution. The first 4 digits of a financial institution's routing number typically contain information about its geolocation. In an example embodiment, this can be based on the routing number system of the American Bankers Association, as described in https://www.bankersonline.com/articles/107095 (last accessed Nov. 21, 2022).

According to a first example of the present disclosure, the one or more financial institutions can be named as follows: (1) "Chase bank for consumers"; (2) "Chase bank for businesses"; (3) "Chase Manhattan bank for consumers"; (4) "Bank of America". Each of these financial institutions can have a different routing number, and their location based on the routing number can be determined as described in step 110.

According to a second example of the present disclosure, the one or more financial institutions can be named as follows: (1) "Morgan Bank"; (2) "Morgan Chase"; (3) "Morgan Stanley"; (4) "Bank of America". Each of these financial institutions can have a different routing number, and their location based on the routing number can be determined as described in step 110.

At step 120, geolocation data of a user based on the user's internet protocol (IP) address is obtained. Geolocation data allows for determining a location of the user. This data is created from a signal received from an electronic device operated by a user, such as e.g., a mobile phone, connected car, or smart watch to name a few. Known techniques can be used to obtain the geolocation of a user based on their IP address. For example, the technique described in U.S. Pat. No. 9,762,683 and/or https://www.linuxjournal.com/article/7856 (last accessed Dec. 5, 2022) may be used.

At step 130, a first user input indicating a financial institution is obtained. The user input can indicate a name and/or another identifier of a financial institution engaged in the business of dealing with financial and monetary transactions such as deposits, loans, investments, currency exchange, etc.

In an example embodiment, the first user input can be obtained from a user interface. As noted earlier, with respect to step 120, the user interface can be on an electronic device operated by a user, such as e.g., a mobile phone, connected car, smart watch, or a computer.

In one or more embodiments, the first user input can be obtained using a check or other financial documents associated with the financial institution. OCR (optical character recognition) techniques can be used to identify and extract the name of the financial institution from the financial documents. Various OCR systems and techniques are well known to those of skill in the art. Consequently, a more detailed description of the operation of any specific OCR technique used to identify and extract the declared industry associated with each of the financial documents is omitted here to avoid detracting from the invention. JSON (JavaScript Object Notation) can be used as an open-standard file format that uses human readable text to transmit data objects consisting of attribute-value pairs and array data types. Importantly, when text is converted into JSON file format, each object in the text is described as an object at a very precise location in the text document. Consequently, when text data, such as financial document data is converted into JSON file format, the name of the financial institution can be indicated as the object and the precise location of the object and data associated with that object in the vicinity of the object is indicated. JSON is well known to those of skill in the art, therefore a more detailed discussion of JSON, and JSON file formatting, is omitted here to avoid detracting from the invention.

Continuing with the first example provided above with respect to step 110, the first user input indicating a financial institution may be "Chase bank". Continuing with the second example provided above, the first user input may be "Morgan JP".

At step 140, a match score is generated for each of the one or more financial institutions that indicates a level of match between the first user input of step 130 (indicating a financial institution) and the respective financial institution of step 110. In an example embodiment, the match score can range from 0 to 1, where 0 indicates a non-match when there is no match between a character string input by the user and a name of the financial institution. In this embodiment, a 1 indicates a perfect match when a character string input by the user and a name of the financial institution match exactly.

Figure 2:
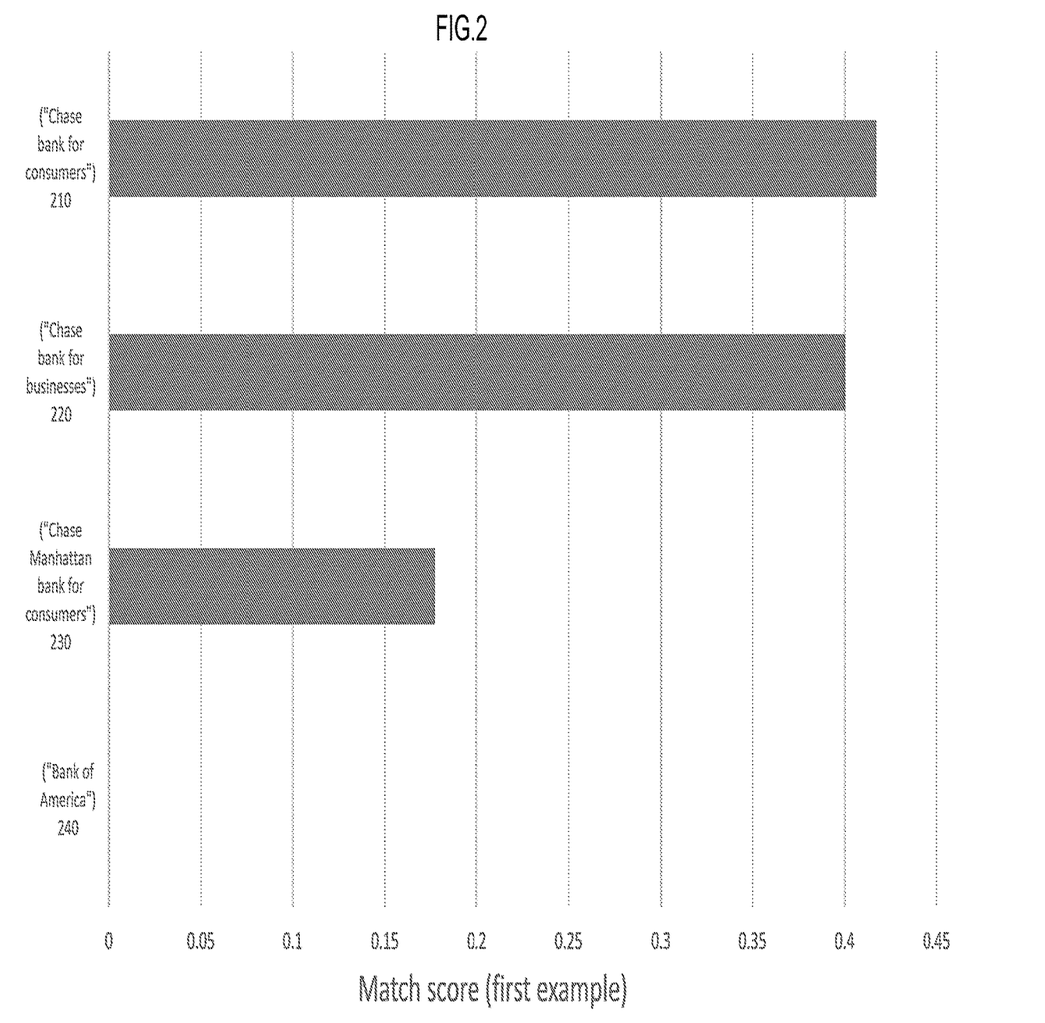
FIG. 2 illustrates an example bar graph according to an example embodiment of the present disclosure.

FIG. 2 illustrates a bar graph with the match score being displayed as a bar that fills in as the score gets closer to 1. The bar graph is based on the first example described in step 110 with four financial institutions and the first user input of step 130. The first user input is "Chase bank", therefore, the match score with respect to the financial institution 210 named "Chase bank for consumers" is 10/24=0.417. This is because 10 characters of the first user input match with the characters ("Chase bank") in the name of the financial institution that has 24 characters in total.

Using the same technique for calculations, for the financial institution 220 named "Chase bank for businesses", the match score is 10/25=0.4 because only 10 characters of the first user input match with the characters ("Chase bank") in the name of the financial institution that has 25 characters in total. For the financial institution 230 named "Chase Manhattan bank for consumers", the match score is 6/34=0.177 because 6 characters ("Chase") of the first user input match the name of the financial institution that has 34 characters in total. For the financial institution 240 named "Bank of America", the match score is 0/15=0 because no characters of the first user input match the name of the financial institution that has 15 characters in total.

Figure 3:
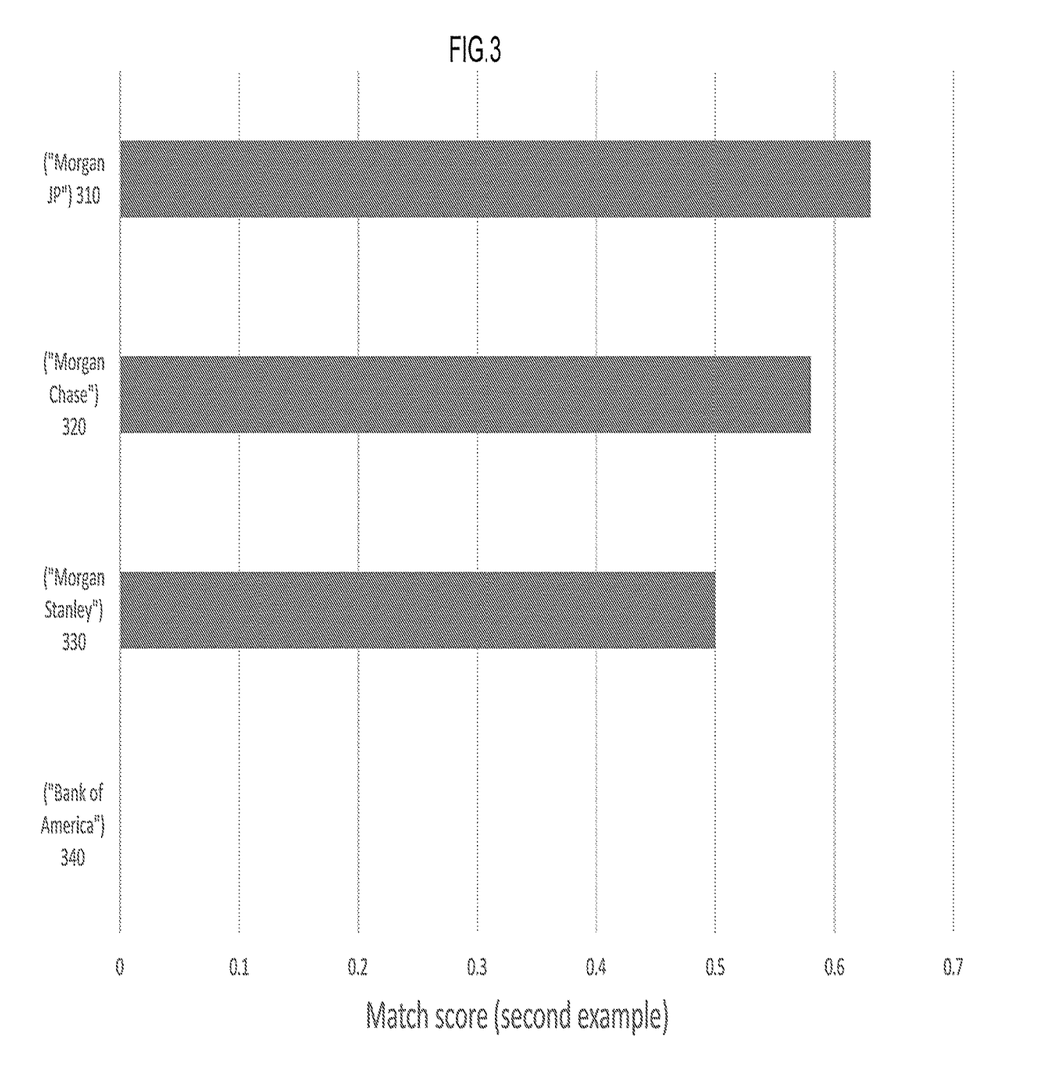
FIG. 3 shows another example bar graph according to an example embodiment of the present disclosure.

FIG. 3 illustrates a bar graph based on the second example described in step 110 with four financial institutions and the second user input of step 130. The first user input is "Morgan JP", therefore, the match score with respect to the financial institution 310 named "Morgan Bank" is 7/11=0.63. This is because only 7 characters of the first user input match with the characters ("Morgan") in the name of the financial institution that has 11 characters in total.

Using the same technique for calculations, for the financial institution 320 named "Morgan Chase", the match score is 7/12=0.58 because only 7 characters of the first user input match with the characters ("Morgan") in the name of the financial institution that has 12 characters in total. For the financial institution 330 named "Morgan Stanley", the match score is 7/14=0.5 because 7 characters ("Morgan") of the first user input match the name of the financial institution that has 14 characters in total. For the financial institution 340 named "Bank of America", the match score is 0/15=0 because no characters of the first user input match the name of the financial institution that has 15 characters in total.

At step 150, the match score can be boosted based on a location of a financial institution that is closest to the user's geolocation. In an example embodiment, the amount to be boosted can be determined using the formula: 1−min (1, distance between the location of the financial institution and the geolocation of a user/greatest distance between two points in the contiguous United States (4654 km)). This formula can be for the USA, but it should be appreciated that the greatest distance between two points can vary for other countries/continents/places.

The distance between the location of the financial institution and the geolocation of a user can be based on a straight-line distance (as the crow flies) from the latitude/longitude coordinates of the bank's geolocation to the user's IP address coordinates. Alternately, the distance between the location of the financial institution and the geolocation of a user can be based on a driving distance from the mailing address of the bank's geolocation to the mailing address derived from user's IP address coordinates. Other known techniques for determining the distance can be used as well.

Using examples of the financial institutions (210-240) described with respect to FIG. 2, if the distance between the financial institution 210 and the geolocation of the user is 2000 km, the boosting amount equals (1−min (1, 2000/4654))=0.57. If the distance between the financial institution 220 and the geolocation of the user is 75 km, the boosting amount equals (1−min (1, 75/4654))=0.984. If the distance between the financial institution 230 and the geolocation of the user is 5 km, the boosting amount equals (1−min (1, 5/4654))=0.999. If the distance between the financial institution 240 and the geolocation of the user is 25 km, the boosting amount equals (1−min (1, 25/4654))=0.995.

Using examples of the financial institutions (310-340) described with respect to FIG. 3, if the distance between the financial institution 310 and the geolocation of the user is 1000 km, the boosting amount equals (1−min (1, 1000/4654))=0.785. If the distance between the financial institution 320 and the geolocation of the user is 150 km, the boosting amount equals (1−min (1, 150/4654))=0.968. If the distance between the financial institution 330 and the geolocation of the user is 50 km, the boosting amount equals (1−min (1, 50/4654))=0.989. If the distance between the financial institution 340 and the geolocation of the user is 250 km, the boosting amount equals (1−min (1, 250/4654))=0.946.

Figure 4:
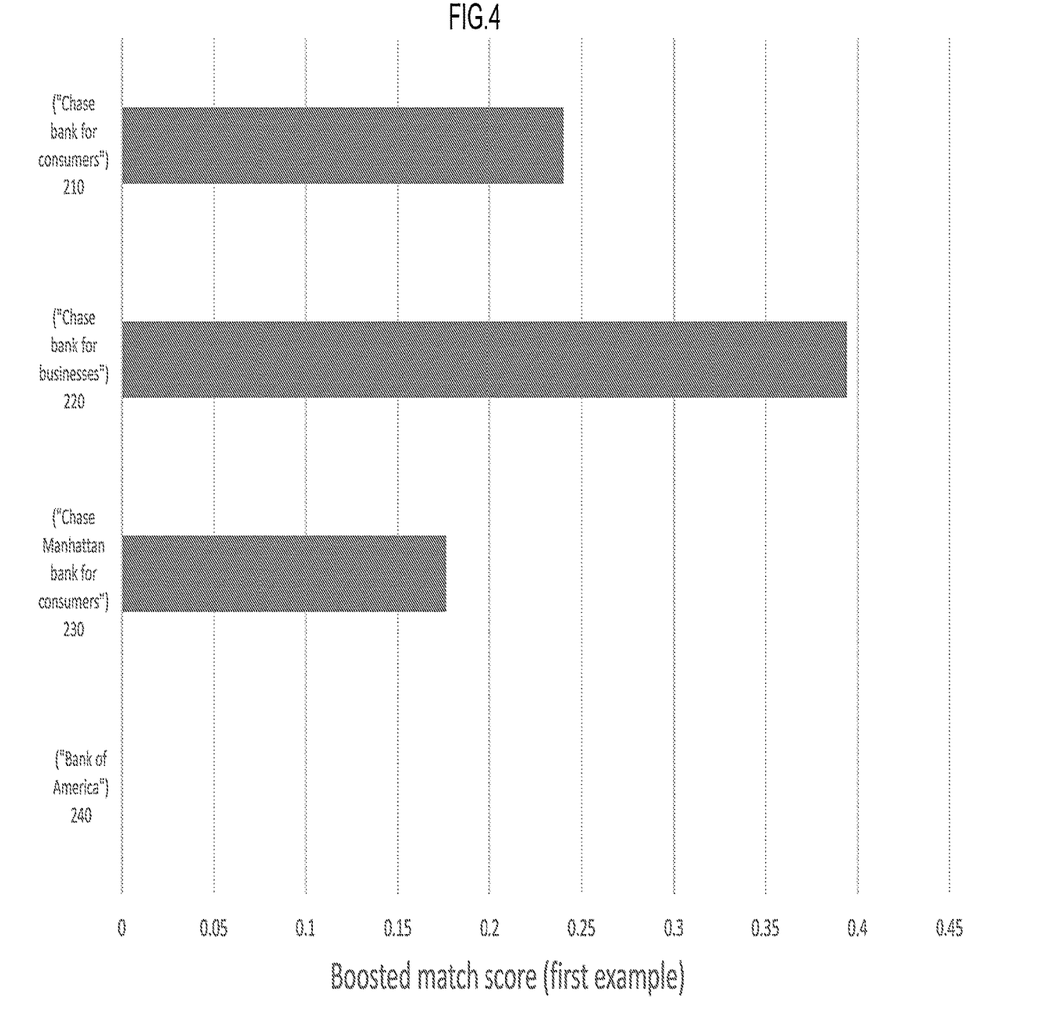
FIG. 4 shows another example bar graph according to an example embodiment of the present disclosure.

The boosting amounts or constants can be multiplied by the match score generated in step 140 to obtain the boosted match score of step 150. FIG. 4 shows a bar graph with the bars representing match scores (of FIG. 2) boosted according to the above-described calculations. The boosted match score for the financial institution 210 is the match score of the financial institution 210 (i.e., 0.417) multiplied with the boosting amount for the financial institution 210 (i.e., 0.57) =0.417*0.57=0.24. Similarly, the boosted match score for the financial institution 220=0.4*0.984=0.394. The boosted match score for the financial institution 230=0.177*0.999=0.176. The boosted match score for the financial institution 240=0*0.995=0.

Figure 5:
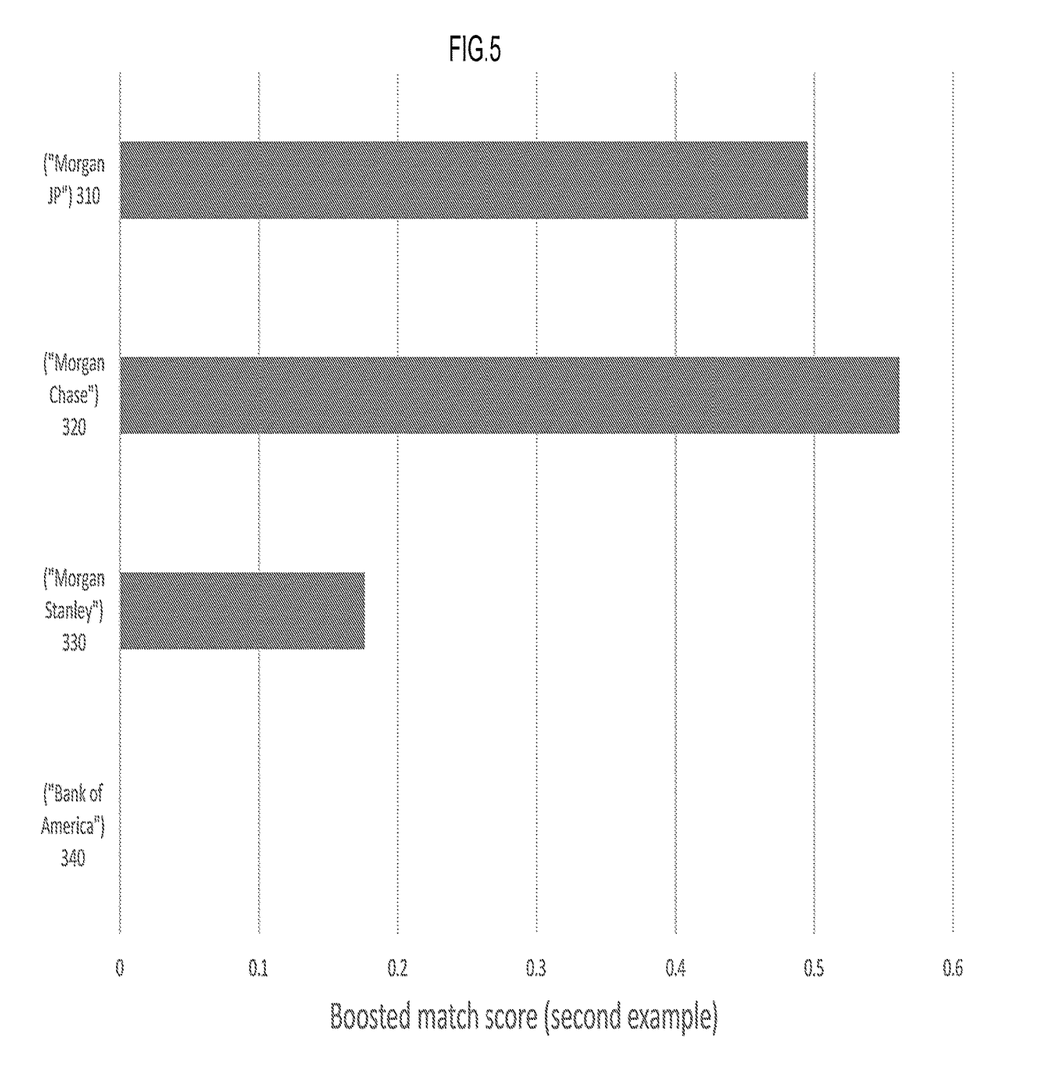
FIG. 5 shows another example bar graph according to an example embodiment of the present disclosure.

FIG. 5 shows a bar graph with the match scores (of FIG. 3) boosted ccording to the above-described calculations. The boosted match score for the financial institution 310 is the match score of the financial institution 310 (i.e., 0.417) multiplied with the boosting amount for the financial institution 310 (i.e., 0.785)=0.63*0.785=0.494. Similarly, the boosted match score for the financial institution 320=0.58*0.968 =0.561. The boosted match score for the financial institution 330=0.5*0.989 =0.176. The boosted match score for the financial institution 340=0*0.946=0.

At step 160, a list of financial institutions having the boosted match score above a threshold is generated. Continuing with the first example, if the threshold is 0.2, then the financial institutions 220 ("Chase bank for businesses") and 230 ("Chase Manhattan bank for consumers") are added to the generated list. For the second example, if the threshold is 0.4, then the financial institutions 310 ("Morgan JP") and 320 ("Morgan Chase") are added to the generated list. In an example embodiment, this list can be an ordered list with a descending order based on the boosted match score.

At step 170, a second user input can be obtained from the user indicating at least one second financial institution. Like the first user input in step 130, the second user input can indicate a name and/or another identifier of a financial institution engaged in the business of dealing with financial and monetary transactions such as deposits, loans, investments, currency exchange, etc.

Continuing with the first example, the second user input indicating the second financial institution is "Bank of Chase" with the first four digits of the routing number (i.e., routing number prefix) as 5476. For the second example, the second user input indicating the second financial institution is "Morgan Bank" with the first four digits of the routing number (i.e., routing number prefix) as 7531.

At step 180, search results can be presented to the user based on the second user input, wherein the search results are boosted based on a similarity between a routing number of the second financial institution and a routing number of the financial institutions in the list generated in step 160.

Continuing with the first example, the routing number prefixes of financial institutions 220 and 230 that are on the list (as described in step 160) can be as follows: 5123, 5488. In such a case, for financial institution 220 ("Chase bank for businesses"), there is one character ("5") that matches between "5123" and "5476", which is the routing number prefix of the second financial institution obtained in step 170. Therefore, the search results can be boosted by a constant factor, e.g., a factor of 1. Similarly, for the financial institution 230 ("Chase Manhattan bank for consumers"), there are two characters ("5" and "4") that match between "5488" and "5476". Therefore, the search results can be boosted by a factor of 2.

For the first example, the routing number prefixes of financial institutions 310 and 320 that are on the list (as described in step 160) can be as follows: 5423, 5468. In such a case, for financial institution 310 ("Morgan JP"), there are two characters ("5" and "3") that match between "5423" and "7531", which is the routing number prefix of the second financial institution obtained in step 170. Therefore, the search results can be boosted by a constant factor, e.g., a factor of 2. Similarly, for the financial institution 320 ("Morgan Chase"), there is one characters ("5") that matches between "5468" and "7531". Therefore, the search results can be boosted by a factor of 1.

Figure 6:
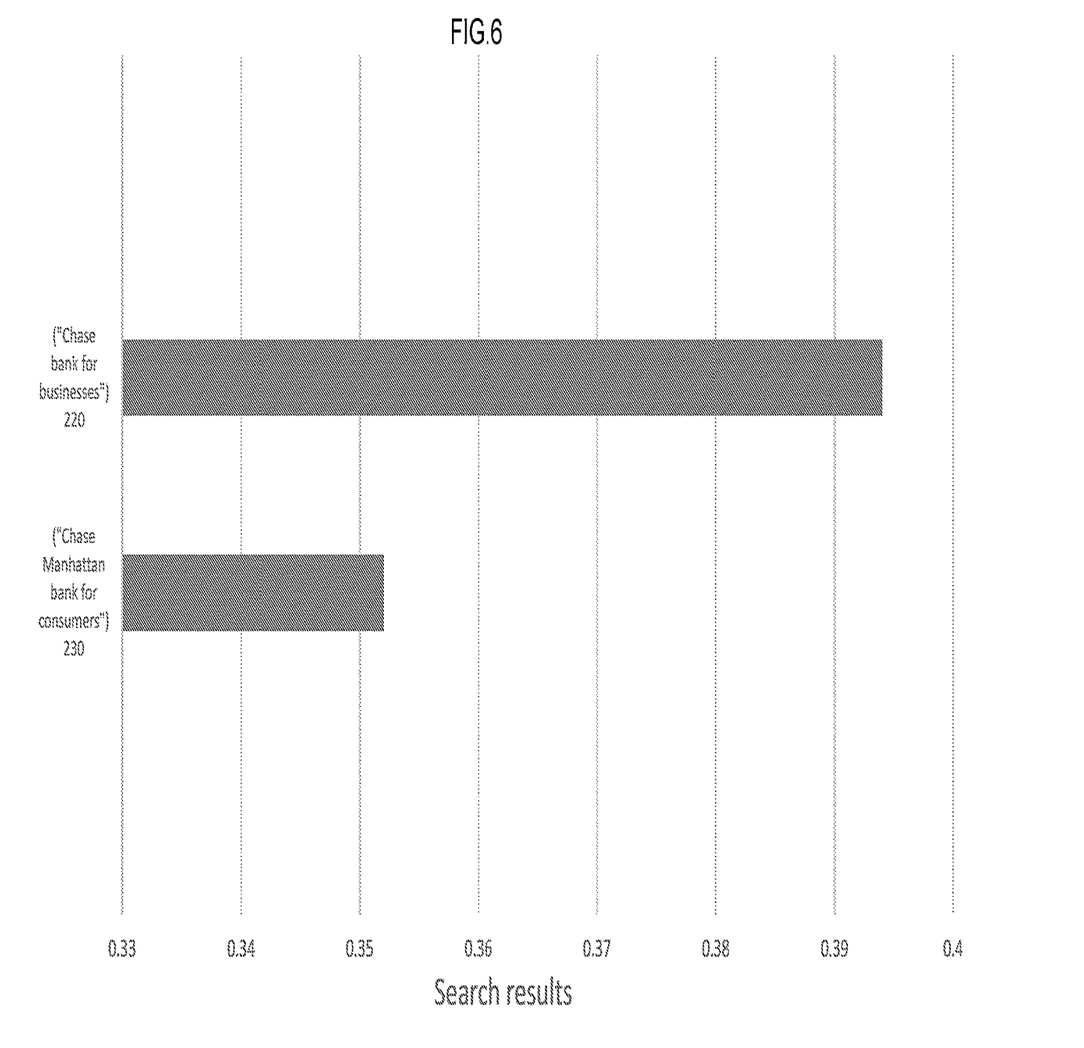
FIG. 6 shows another example bar graph according to an example embodiment of the present disclosure.

FIG. 6 illustrates a bar graph of search results for the first example financial institutions 220 and 230 boosted by a factor of 1 and 2 respectively. Boosting the value of the match score of financial institution 220 by 1 equals 0.394*1 =0.394. Boosting the value of the match score of financial institution 230 by 2 equals 0.176*2=0.352. These values are illustrated by the bars of FIG. 6.

Figure 7:
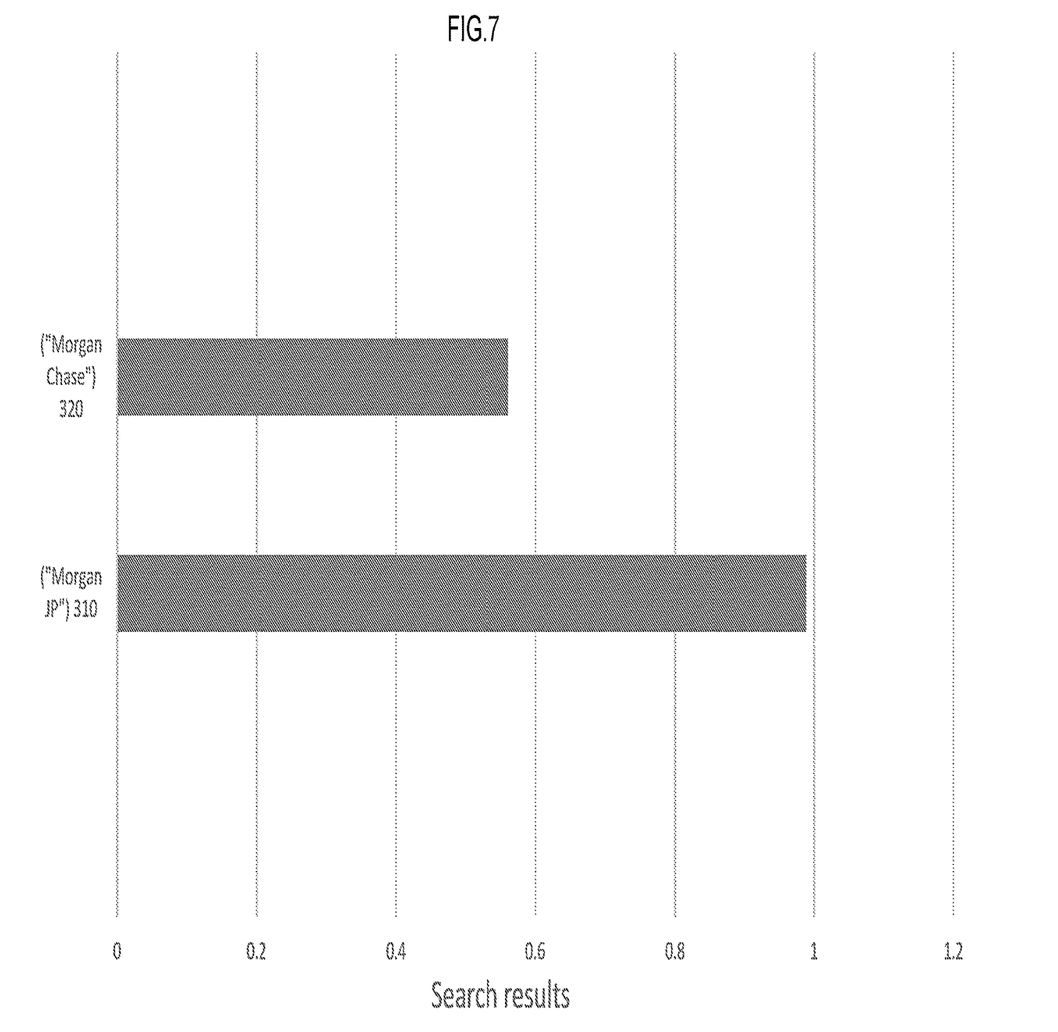
FIG. 7 shows another example bar graph according to an example embodiment of the present disclosure.

FIG. 7 illustrates a bar graph of search results for the second example financial institutions 310 and 320 boosted by a factor of 2 and 1 respectively. Boosting the value of the match score of financial institution 310 by 2 equals 0.495*2=0.99. Boosting the value of the match score of financial institution 320 by 1 equals 0.561*1=0.561. These values are illustrated by the bars of FIG. 7.

Some or all of the aforementioned embodiments of the method 100 can be directed to various software/products/services such as catalog services, order services, subscription services, billing services, account services, entitlement services for tax preparation software product or software service, financial management software product or software service, payroll software product or software service, accounting software product or software service, etc.

Figure 8:
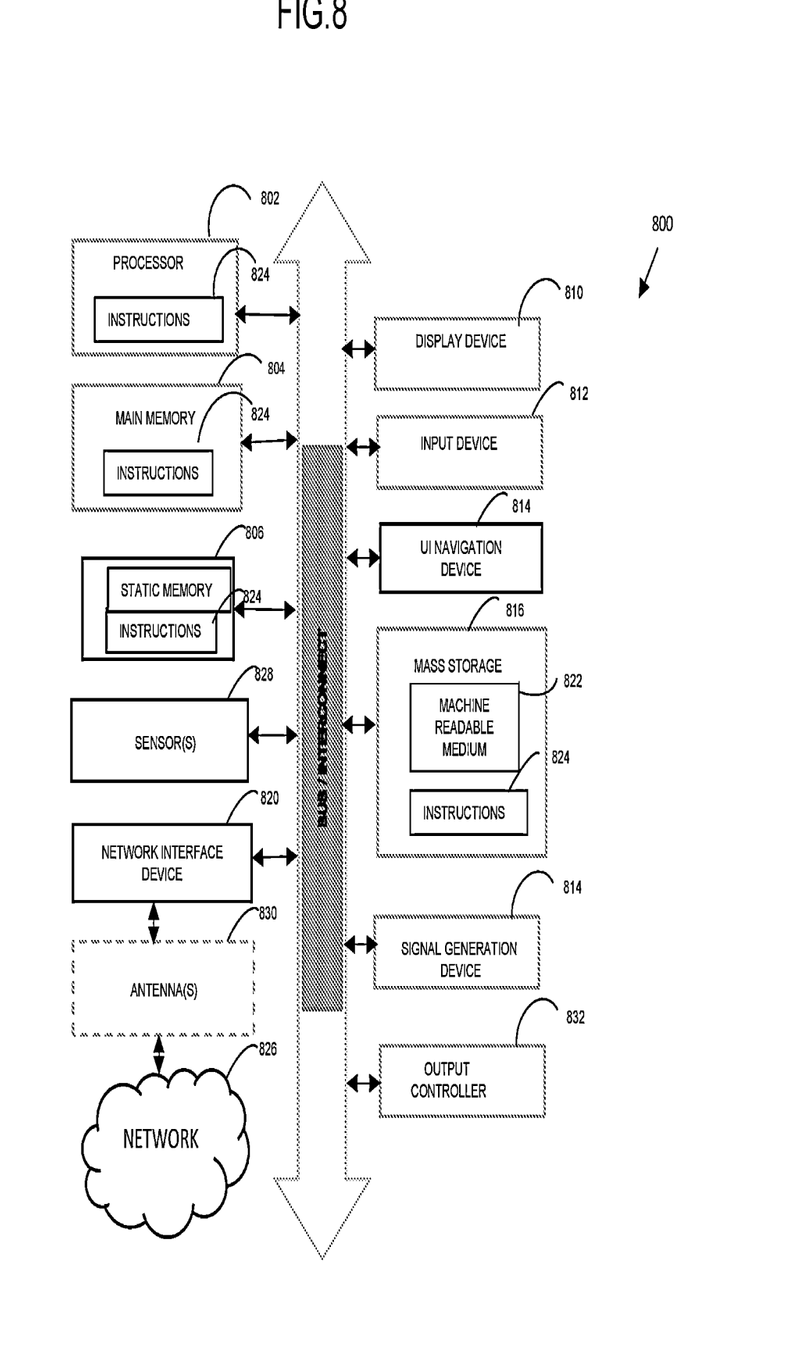
FIG. 8 illustrates an example of a machine configured to perform computing operations according to an embodiment of the present disclosure.

FIG. 8 is a block diagram illustrating an example computing system 800 which any one or more of the methodologies (e.g., method 100) herein discussed may be run according to an example described herein. Computer system 800 may be embodied as a computing device, providing operations of the components featured in the various figures, including components of the method 100, or any other processing or computing platform or component described or referred to herein.

In alternative embodiments, the computing system 800 can operate as a standalone device or may be connected (e.g., networked) to other machines. In a networked deployment, the computing system 800 may operate in the capacity of either a server or a client machine in server-client network environments, or it may act as a peer machine in peer-to-peer (or distributed) network environments.

Example computer system 800 includes a processor 802 (e.g., a central processing unit (CPU), a graphics processing unit (GPU) or both), a main memory 804 and a static memory 806, which communicate with each other via an interconnect 808 (e.g., a link, a bus, etc.). The computer system 800 may further include a video display unit 810, an input device 812 (e.g., keyboard) and a user interface (UI) navigation device 814 (e.g., a mouse). In one embodiment, the video display unit 810, input device 812 and UI navigation device 814 are a touch screen display. The computer system 800 may additionally include a storage device 816 (e.g., a drive unit), a signal generation device 818 (e.g., a speaker), an output controller 832, and a network interface device 820 (which may include or operably communicate with one or more antennas 830, transceivers, or other wireless communications hardware), and one or more sensors 828.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 constituting machine-readable media.

While the machine-readable medium 822 (or computer-readable medium) is illustrated in an example embodiment to be a single medium, the term "machine-readable medium" may include a single medium or multiple medium (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, magnetic media or other non-transitory media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of several well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that can store, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. For example, the features in the system architecture 800 of the processing system may be client-operated software or be embodied on a server running an operating system with software running thereon. While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Examples, as described herein, may include, or may operate on, logic or several components, modules, features, or mechanisms. Such items are tangible entities (e.g., hardware) capable of performing specified operations and may be configured or arranged in a certain manner. In an example, circuits may be arranged (e.g., internally or with respect to external entities such as other circuits) in a specified manner as a module, component, or feature. In an example, the whole or part of one or more computer systems (e.g., a standalone, client or server computer system) or one or more hardware processors may be configured by firmware or software (e.g., instructions, an application portion, or an application) as an item that operates to perform specified operations. In an example, the software may reside on a machine readable medium. In an example, the software, when executed by underlying hardware, causes the hardware to perform the specified operations.

Accordingly, such modules, components, and features are understood to encompass a tangible entity, be that an entity that is physically constructed, specifically configured (e.g., hardwired), or temporarily (e.g., transitorily) configured (e.g., programmed) to operate in a specified manner or to perform part or all operations described herein. Considering examples in which modules, components, and features are temporarily configured, each of the items need not be instantiated at any one moment in time. For example, where the modules, components, and features comprise a general-purpose hardware processor configured using software, the general-purpose hardware processor may be configured as respective different items at different times. Software may accordingly configure a hardware processor, for example, to constitute a particular item at one instance of time and to constitute a different item at a different instance of time.

Additional examples of the presently described method, system, and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

The invention claimed is:

1. A computer-implemented method, comprising:
   mapping routing numbers of one or more financial institutions with geolocation data of the financial institutions;
   obtaining a geolocation of a user based on an internet protocol (IP) address of a user device;
   obtaining a first user input from the user indicating a first financial institution;
   generating a match score for each of the one or more financial institutions that indicates a level of match between the first user input and the respective financial institution;
   boosting the match score for each financial institution based on its location with respect to the geolocation of the user;
   generating a list of financial institutions having the boosted match score above a threshold;
   obtaining a second user input from the user indicating at least one second financial institution; and
   presenting search results to the user based on the second user input, wherein the search results are boosted based on a similarity between a routing number of the second financial institution and a routing number of the financial institutions in the generated list.

2. The method of claim 1, wherein the mapping of routing numbers of the financial institutions with geolocation data is based on publicly available information.

3. The method of claim 1, wherein the first user input and/or the second user input is obtained from financial data documents associated with the user.

4. The method of claim 1, wherein the first user input and/or the second user input is obtained from a user interface of device operated by the user.

5. The method of claim 1, wherein the boosting of the match score is based on an amount calculated with the formula: 1−min (1, distance between the location of the financial institution and the geolocation of a user/greatest distance between two points in a jurisdiction).

6. The method of claim 5, wherein the distance between the location of the financial institution and the geolocation of a user is based on a straight-line distance.

7. The method of claim 5, wherein the distance between the location of the financial institution and the geolocation of a user is based on a driving distance.

8. The method of claim 1, wherein the threshold for generating a list of financial institutions is a predetermined constant.

9. The method of claim 1, wherein the similarity between a routing number of the second financial institution and a routing number of the financial institutions in the generated list is based on a routing number prefix.

10. The method of claim 1, wherein the geolocation data of the user is based on the user's internet protocol (IP) address.

11. A system for detecting fraud comprising a processor and an associated memory, the processor being configured for:
    mapping routing numbers of one or more financial institutions with geolocation data of the financial institutions;
    obtaining a geolocation of a user based on the user's internet protocol (IP) address;
    obtaining a first user input from the user indicating a first financial institution;
    generating a match score for each of the one or more financial institutions that indicates a level of match between the first user input and the respective financial institution;
    boosting the match score for each financial institution based on its location with respect to the geolocation of the user;
    generating a list of financial institutions having the boosted match score above a threshold;
    obtaining a second user input from the user indicating at least one second financial institution; and
    presenting search results to the user based on the second user input, wherein the search results are boosted based on a similarity between a routing number of the second financial institution and a routing number of the financial institutions in the generated list.

12. The system of claim 11, wherein the mapping of routing numbers of the financial institutions with geolocation data is based on publicly available information.

13. The system of claim 11, wherein the first user input and/or the second user input is obtained from financial data documents associated with the user.

14. The system of claim 11, wherein the first user input and/or the second user input is obtained from a user interface of device operated by the user.

15. The system of claim 11, wherein the boosting of the match score is based on an amount calculated with the formula: 1−min (1, distance between the location of the financial institution and the geolocation of a user/greatest distance between two points in a jurisdiction).

16. The system of claim 15, wherein the distance between the location of the financial institution and the geolocation of a user is based on a straight-line distance.

17. The system of claim 15, wherein the distance between the location of the financial institution and the geolocation of a user is based on a driving distance.

18. The system of claim 11, wherein the threshold for generating a list of financial institutions is a predetermined constant.

19. The system of claim 11, wherein the similarity between a routing number of the second financial institution and a routing number of the financial institutions in the generated list is based on a routing number prefix.

20. The system of claim 11, wherein the geolocation data of the user is based on the user's internet protocol (IP) address.

* * * * *